Nov. 26, 1968      L. G. FETERL      3,412,982

FEED MIXER AND METHOD

Filed Aug. 23, 1965      3 Sheets-Sheet 1

INVENTOR.
Leon G. Feterl
BY
Williamson & Palmatier
ATTORNEYS

Nov. 26, 1968 L. G. FETERL 3,412,982
FEED MIXER AND METHOD
Filed Aug. 23, 1965 3 Sheets-Sheet 2

INVENTOR.
Leon G. Feterl
BY
Williamson & Palmatier
ATTORNEYS

Nov. 26, 1968  L. G. FETERL  3,412,982
FEED MIXER AND METHOD
Filed Aug. 23, 1965  3 Sheets-Sheet 3

INVENTOR
LEON G. FETERL
BY
Williamson+Palmatier
ATTORNEYS

United States Patent Office 3,412,982
Patented Nov. 26, 1968

3,412,982
FEED MIXER AND METHOD
Leon G. Feterl, Salem, S. Dak. 57058
Continuation-in-part of application Ser. No. 382,271,
July 13, 1964. This application Aug. 23, 1965, Ser.
No. 481,873
7 Claims. (Cl. 259—4)

ABSTRACT OF THE DISCLOSURE

A method and apparatus for mixing stock feed materials comprising the use of a walled mixing chamber having a bottom, side, and end walls and employment of an endless conveyor therein having a bottom run disposed above the bottom of the chamber and a top run disposed near the top of the chamber, with a sloped intermediate run therebetween, said conveyor being utilized to mix the feed materials in cyclic, circuitous fashion.

This application is a continuation-in-part of application Ser. No. 382,271, filed July 13, 1964, entitled "Feed Mixer," now forfeited.

This invention relates to an improved feed mixer and dispenser particularly adapted for intimately admixing larger feed ingredients such as silage and alfalfa with other stock feed ingredients including cereal grains in shelled or kernel form and feed pellets which may contain minerals, vitamins and the like.

To the best of my knowledge, prior art feed mixers for operating upon coarse and bulky materials are at the most partially successful in intimately admixing such coarse materials with small particle feed materials such as cereal grains, pellets and the like, and have a serious tendency to stratify the ingredients at the discharge. Thus, in the ultimate dispensing of the mixture to feed bunkers, troughs and the like, as high as 25% by volume portions of a dispensing run will contain substantially more of one or more of the ingredients than the proportion desired. With such prior mixers the divisions at one end of an elongated feed bunker may contain as high as 50% more of one ingredient than the divisions at the opposite end of the bunker.

It is an object of my invention to provide an efficient method and simplified apparatus for thoroughly and uniformly dispersing, fluffing and admixing a number of feed ingredients which include as one thereof, coarse feed material such as silage, and where the several feed ingredients vary substantially in size, shape and specific gravity to overcome said previously recited shortcomings of prior art devices, and to assure ultimate dispensing, throughout the entire discharge operation, a mixture having the desired predetermined proportion of said several ingredients.

Another important object is the provision of a method and apparatus of the class described wherein the efficient admixing of the feed materials as well as dispensing of the intimate mixture may be carried out during travel of the machine or apparatus, or when the machine is not in travel.

A further object is to provide a novel method of admixing feed materials of widely varying size, shape and specific gravity wherein the several ingredients may be introduced into a large mixing container or body successively and substantially at random to nevertheless, after adequate operation of the mixing steps produce an intimate dispersion and admixture of all ingredients and wherein controlled discharge of such admixture is assured without stratification or concentration of any of the ingredients throughout the entire volume of the material dispensed.

The intimate uniform admixture previously recited is achieved in my invention principally through a continuous rolling, moving, dropping and dispersion action of all materials in an endless circuitous pattern which includes travel and undulation of the material along the bottom portion of a mixing body towards the ultimate (then closed) discharge area, then upwardly and horizontally and downwardly partially across the upper portion of the body in reverse direction to the said bottom travel, then in a continuous cycle, dropping with the aid of gravity upon the centrally and downwardly disposed portions of the mixing body and with repetition of said cycle many times.

The most essential elements of the machine or apparatus of my invention comprise an endless conveying and mixing medium, trained and arranged with respect to a large, generally rectangular mixing body or container and having top and bottom runs traversing the interior of said container, whereby when driven the lower run will move and disperse material towards an ultimate dispensing means, and the upper run will move material at first generally horizontally in the reverse direction from the lower run and then drop and disperse material downwardly to fall upon and intersperse with material within a central portion of the mixing body. My novel combination of mixing steps are carried out through the cooperation of said mechanical elements in continuous operation for a desired predetermined period.

The foregoing objects, operations and advantages will be more fully apparent from the following description and specification made in connection with the accompanying drawings, wherein like reference characters are referred to in similar parts throughout the several views, and in which.

Figure 4:
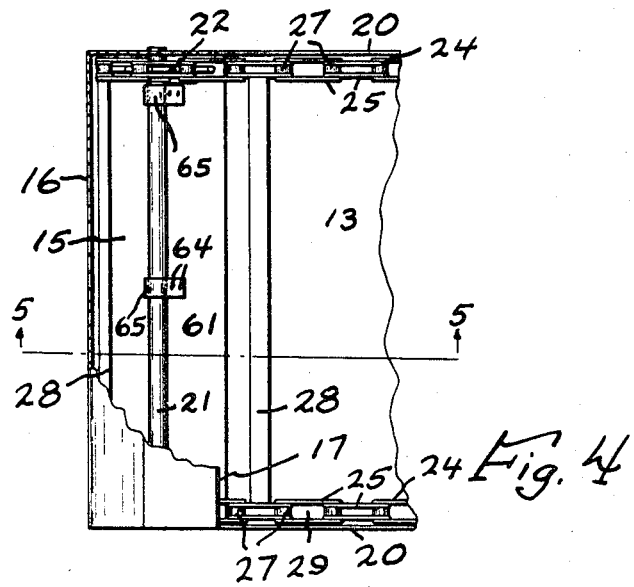
FIG. 4 is a top plan view of one end of a somewhat modified embodiment of the invention.
Figure 5:
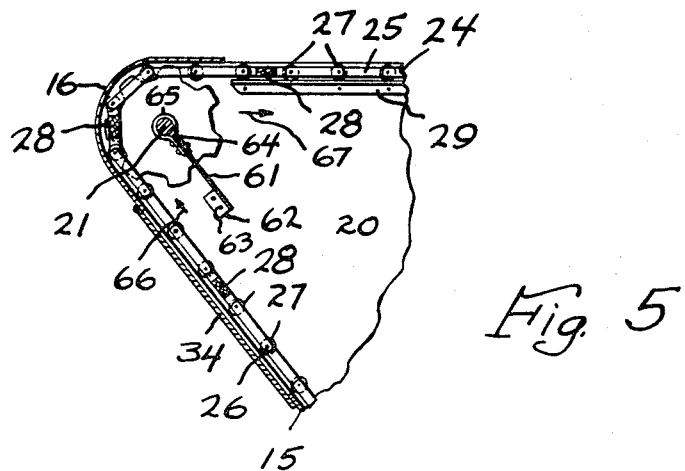
FIG. 5 is a vertical section taken substantially along the section line 5—5 of FIG. 4.
Figure 6:
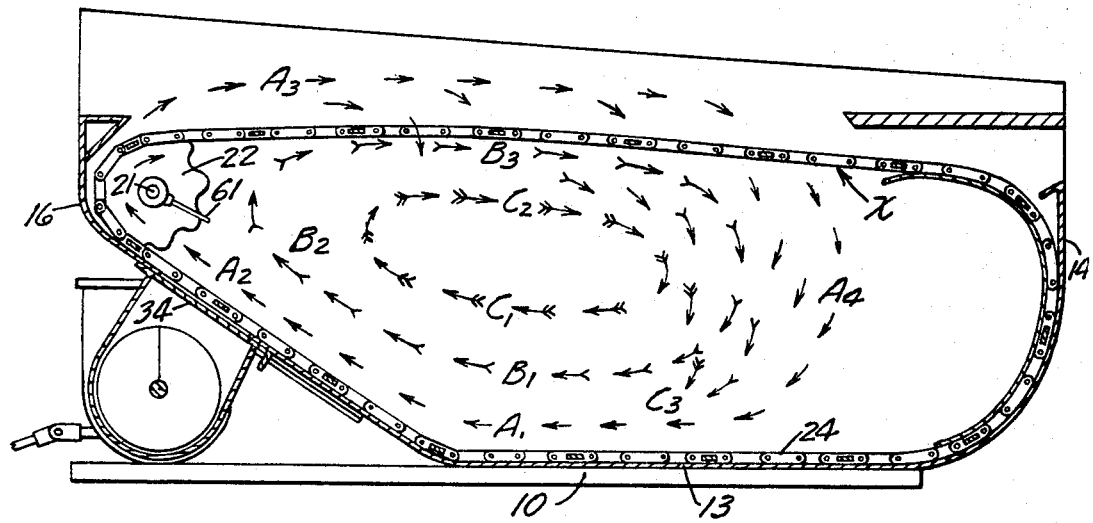
Figure 7:
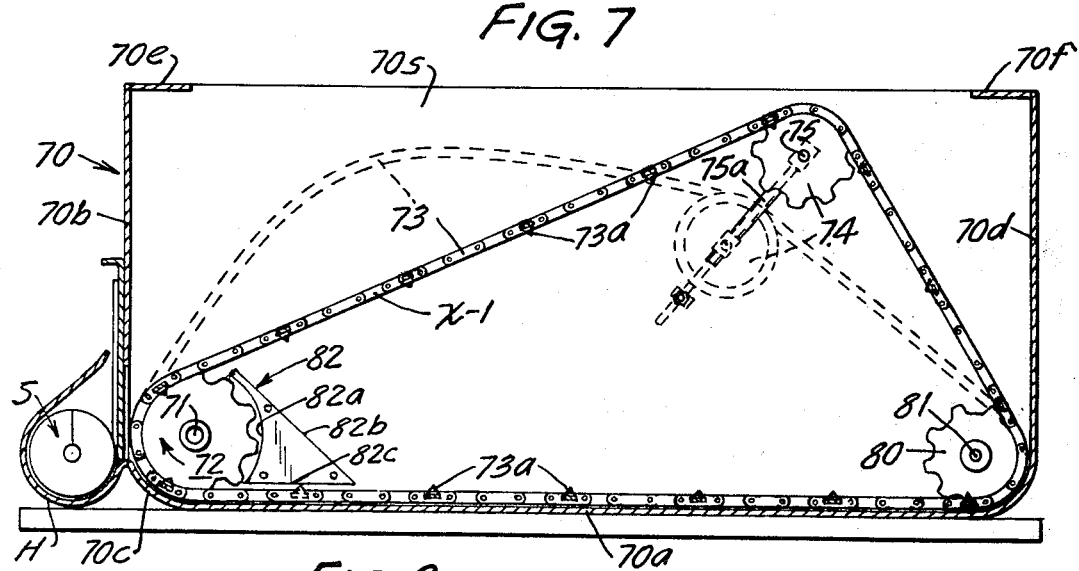
Figure 8:
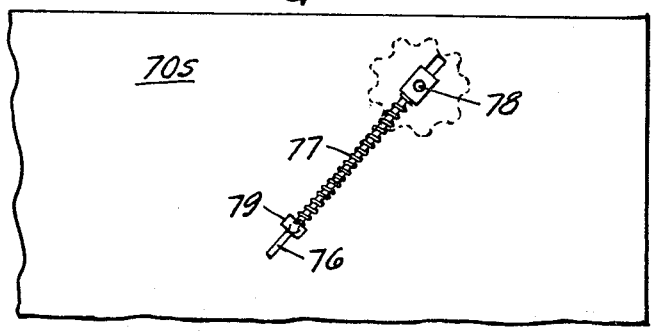

FIG. 6 is a diagrammatic view generally taken at a vertical section of my mixer machine or apparatus illustrating the travel, dispersion and admixing of the various feed ingredients which inherently occurs with the apparatus and its operation of FIGS. 1 to 5; and FIG. 7 is a vertical longitudinal section of another somewhat simplified embodiment of my apparatus invention adapted for handling smaller overall volume of feed materials; and FIG. 8 is a detail fragmentary side elevation showing the thrust bar and sprocket tensioning device.

Figure 1:
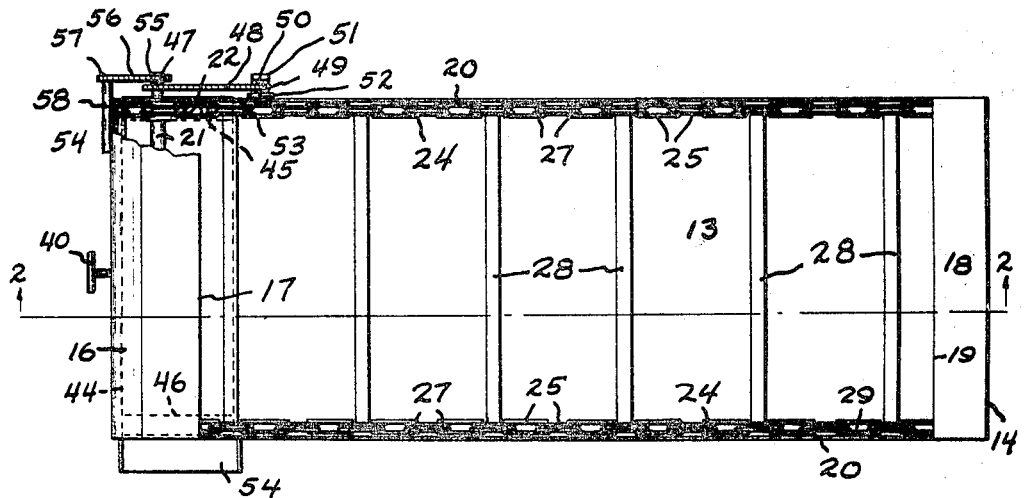
FIG. 1 is a top plan view of an embodiment of my improved feed mixer.
Figure 2:
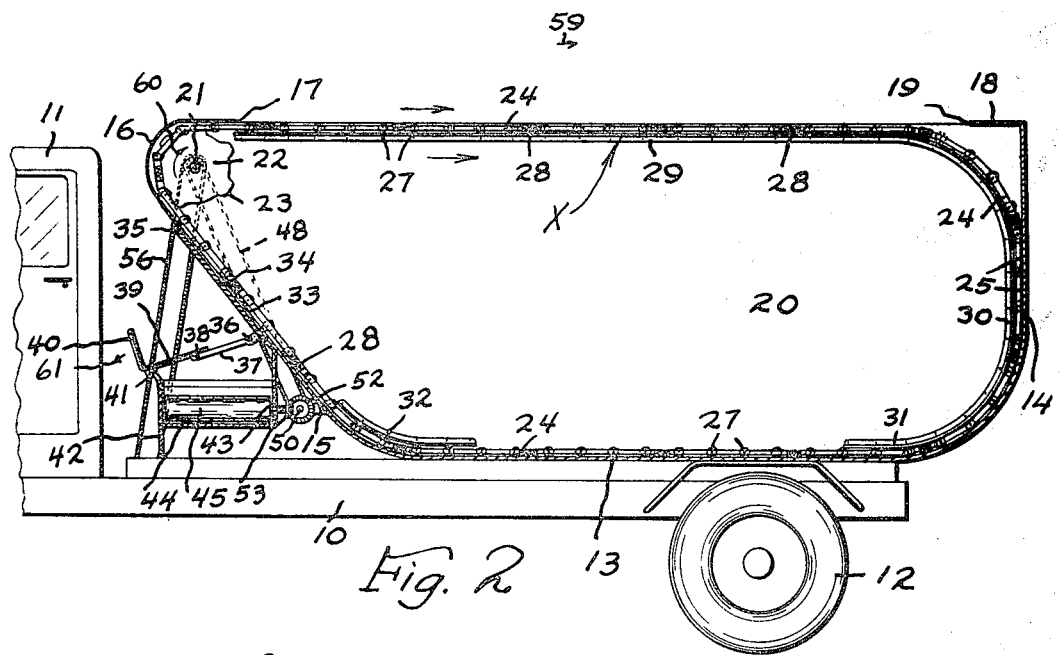
FIG. 2 is a vertical section taken substantially along the line 2—2 of FIG. 1.
Figure 3:
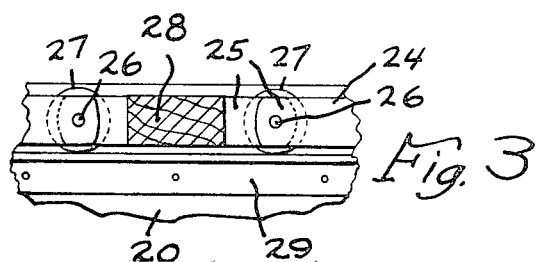
FIG. 3 is an enlarged detail cross section showing the roller chain of my conveying and mixing medium guided by a portion of a track on one of the mixer body walls.

Referring now to the embodiment of my invention in FIGS. 1 to 3 and diagrammatically in FIG. 6 of the drawings, my feed mixing apparatus is shown as mounted upon the base of a truck or similar vehicle, designated by the numeral 10, and which vehicle has a cab 11 and rear wheels 12.

I provide a large, generally rectangular mixing container or box having a bottom 13, a rear wall 14, an inclined forward wall 15, which at its upper and forward portion has a curved wall area 16, terminating inwardly over the top of the box or mixing container along a line 17. The top of the box or container is for the most part open but there is a ledge wall substantially horizontally disposed, indicated by the character 18 and terminating inwardly over the top of the box along the line 19. The two side walls of the box or mixing container are indicated as 20, and suitably journaled therein, is a transverse shaft 21 with the terminal portions along sides 20 attached to sprockets 22 of a type adapted to receive and entrain roller chains having sprocket teeth 23. Shaft 21 is suitably journaled (not specifically shown) in the walls 20.

A pair of endless roller chains 24 are entrained at the forward upper corners of the box about the respective sprockets 22, each of said endless chains being disposed very compactly against one of the side walls 20 of the box. The form of the chains illustrated, comprise for each unit, inner and outer links 25 which are connected by means of transverse pins 26 and rollers 27 are interposed between each set of links journaled on pins 26 and having a diameter somewhat greater than the width of the links for a purpose to be later made clear.

Between the two endless roller chains are mounted transverse slats 28, spaced widely apart, as for example from 18 to 26 inches, and which are secured as by butt welding to the inner lengths of corresponding units of the two chains. As shown, these slats are of rectangular cross section and in thickness approximate the widths of the links, although of course this thickness may be substantially varied, all within the concepts of my invention.

While various means for training, distending and guiding the endless slatted structure which as will later be seen constitutes a mixing and conveyor medium, in the form of the invention shown in FIGS. 1 to 3, guiding and distending of the endless slatted medium is essential in generally eliptic and rectangular manner within the container or box and with its bottom run disposed generally above the bottom of the container, is achieved by the upper forward sprockets 22 in cooperation with another later-to-be-described set of sprockets, and/or in several track sections which conveniently at the very sides of the vertical walls, receive and guide the rollers of the two chains. Thus, a pair of angle shaped tracks 29 are supported just below the open top of the box extending substantially horizontally for some distance from points just rearwardly of sprockets 22 across the greater part of the top of the mixing container, numbers 30 and 31 respectively identifying the further extension of said tracks and numeral 32 indicating additional track sections, as shown on the drawings. All of said sections are attached to the side walls 20. It will be understood that the slats 28 are preferably, in this embodiment, of the same thickness as the width of links 25 so that rollers 27 only bear against the various tracks.

A discharge opening 33 is formed in the inclined forward end of the box or container adjustably covered by a flat door 34 which extends substantially the entire width of the box and which door is hinged at 35, as shown in FIGS. 1 to 3. Link 37 is pivoted to door 34 at point 36 and this link is pivoted at 38 to an additional link 39 which is attached to the operating handle 40, link 39 being pivoted at 41 to the upper side of the member 42.

A suitable cross conveyor indicated as an entirety by the letter C is provided across the forward end and lower portion of the box or mixing container, receiving the thoroughly admixed material through the passage or discharge opening 33, as controlled by the extent of opening of discharge door 34. In the form shown in FIGS. 1 and 2 the cross conveyor is of endless apron or belt type, being operatively mounted within a transverse channel which has a vertical rear wall 43 and a forward, substantially vertical wall 42, which as previously mentioned, is the member to which the link 39 for door control is pivoted. Conveyor C includes an endless conveyor apron 44 trained about the rollers 45 and 46.

For driving the main sprocket shaft 21 and also the cross delivery conveyor C, an endless chain 48 is trained over a sprocket 47 (see FIGS. 1 and 2) and is further trained about a sprocket 49 which is attached to a driven cross shaft 50 disposed just forwardly of the lower forward portion of the mixing box. Shaft 50 is journaled within a bracket 51 (see FIG. 1) and has affixed thereto a beveled gear 52 which engages a second beveled gear 53 affixed to the extended shaft of roller 45. The cross conveyor C includes a bottom and delivery extension 54, said extension preferably being slightly inclined to facilitate discharge to bunkers or other feeding devices.

Driving power is supplied to the shaft 21 by a sprocket chain 56 which is trained about a second sprocket 55 affixed to the extremity of shaft 21, said endless sprocket chain extending downwardly, being trained about a sprocket 57 affixed to a jack shaft 58 which is suitably connected for driving to the motor of the vehicle or truck with interposition of a suitable shaft clutch mechanism (not shown). If my machine utilizes a separate frame supported on wheels for draft connection with a tractor, the power takeoff from the tractor may be suitably connected for driving with a shaft or other means for supplying power to driven shaft 21 of the mixer as well as to the shaft which drives the cross conveyor.

The important and vital conveying, mixing and dispersing medium arranged generally in elliptical manner with its periphery close to the cross sectional area of the mixing container as an entirety, is indicated by the letter X, comprising of course the two endless chains 24 with the widely spaced slats 28 interconnected therebetween and including the means for positioning, distending and supporting such chains.

*Operation*

In operation, the enlarged endless conveying, mixing and dispersing medium indicated as an entirety by the letter X, and comprising the widely spaced pair of endless roller chains with the widely spaced transverse slats 28 attached thereto, is driven as indicated by the enlarged arrows in FIG. 2, through the power medium of the truck motor or separate motor mounted on the truck connected for driving the shaft 58 which is connected by chain or belt 56 to drive the sprocket shaft 21 at the upper forward corner of the mixer box or container.

Where my device utilizes a wheeled frame having draft connection for a tractor T, shaft 50 or equivalent therefor is driven from the power takeoff from the tractor.

The said endless conveying, mixing and dispersing medium X is suitably distended and guided to substantially conform to the interior dimensions of the mixing box or container in a generally elliptic, rectangular form with its bottom run moving and supported upon the bottom 13 of the box, and with the top run disposed at least near the top of the box, with the inclined forward run working in close proximity to the inclined forward wall 34 of the box.

In the form of the invention illustrated in FIGS. 1, 2, 3 and 6, the means for guiding, training and positioning said endless medium constitute at the forward upper corners of the elliptical endless medium, the roller chain sprockets 22 while the training and guiding of the chains of the endless medium elsewhere throughout its orientation is nicely provided by the flanged track sections 29 (at top), 30 (at rear), 31 (curved inwardly to horizontal position from rear), and 32 (spaced widely from 31), and guiding chains from bottom into upward travel along the sloping forward wall 34.

It will of course be understood that various other training and guiding means or equivalents may be utilized for distending and positioning the said endless medium in its important general relationship and form.

Various feed materials such as silage, alfalfa, hay, cereal grains including corn, and pellets, all of which vary substantially in specific gravity in the form of FIGS. 1 to 3 may be dumped into the open top of the box or mixing container and this may be done while my machine is in travel or is at rest. Usually measured quantities of the various desired ingredients are admitted by chute or conveyor but the sequence of supplying may be at random which often is desirable since the machine may be moved from one source to another. Regardless of said random and measured supply, in its operation my machine and method assures an intimate admixture and ultimate, uniform discharge of the mixture without stratification and to specification.

The feed ingredients or materials supplied drop through the open work upper run of the endless medium, usually being struck and impacted by the slats of the upper run, moving rather rapidly towards the rear of the machine and the falling material, by gravity, is initially somewhat broken up from enlarged, flocculent state, falling and accumulating upon the material disposed therebelow and at first of course, upon the lower run of the medium X which is moving as indicated by the arrow in FIG. 1 towards the discharge door 34, toward the front of the machine in the embodiment shown.

In FIG. 6 the movement, travel, dispersal and intimate mixing of the various feed ingredients are correctly and diagrammatically shown with the box or mixing container loaded to a desirable state (but not capacity) for intimately mixing the ingredients.

The single lined arrows from positions A-1 to A-2, to A-3 and to A-4 show the successive movements, lifting, then reversely moving, then dropping and dispersing such ingredients, particles and chunks to necessarily cause dispersion thereof in the general rolling and fluffing mass of material. The arrows with single tails starting from the stratum above lower stratum (A series), indicate the travel of such particles and chunks from the positions B-1 forwardly and upwardly through B-2, then upwardly and in reverse direction to the position B-3, where they begin to widely disperse, separate and drop through gravity upon and into the fluffed intermediate portion of the mass. Likewise, the double tailed arrows indicate the travel, dispersal and dropping of particles and chunks at the core of the mass within the endless medium X, showing that at the top of the travel C-2, these portions and particles disperse widely, drop differentially, and are thoroughly admixed within the central rear confines of the endless member in position C-3.

Observance of operation shows that in travel throughout most of a continuous cycle or circuit, the effect of the slats with cooperating flat portions of the box or container and even at the open top portion of the box, produces a constant surging and undulating movement of the materials. Even at the top of the box the material between slats with the material therebelow, progresses from the forward top of the box to the intermediate portion thereof in undulating wave-like form.

The efficient and thorough admixing of feed materials of varying sizes, shapes and specific gravity, may be carried out while the machine is in travel or when the machine is stationary. This facilitates pick-up of various feed ingredients at different places with admixing starting and continuing during travel.

After thorough admixture of the ingredients through the many cycles of the operation of the succession of steps recited, the machine may be traveled through various positions for discharging the mixture. The door 34 may be opened to the degree and the endless slatted element is then again driven in the same direction as for admixing materials, through the lower run and upwardly inclined run thereof, to deliver and discharge the materials through the doorway or opening 35 upon the cross conveyor C. In discharging the mixture as in an elongated feed bunker, the machine may be slowly traveled from bin to bin with the discharge through the extended chute 54 at one side of the machine, successively delivering and discharging material into the several bins.

Thus it will be seen that my invention provides not only a new machine or apparatus for intimately admixing various feed materials without stratification, but also provides a simple and highly efficient new method which generally, as has been previously set forth, consists in the moving of the various materials in a multiplicity of substantially continuous cycles through a circuitous course within a walled mixing chamber having a bottom, and which course includes travel, agitation and dispersing of such materials along a run or portion of the course adjacent the bottom of the chamber in one direction and then upwardly to an area near the top and one end of the chamber, and then in a relatively short travel substantially horizontally and in opposite directions to the first travel run, and finally in each circuit with the assistance of gravity, widely dispersing and dropping fragments of the material downwardly upon the top of the intermediate volume of the mass being mixed.

The method further includes the opening of a discharge passage adjacent the bottom end of the mixing chamber, in the direction of which the first run of the material takes place and then, the continuing of the moving of the material through the circuitous course to controllably dispense the thoroughly mixed material and enable such discharge to be made while the machine itself is in travel.

FIGS. 4 and 5 illustrate another form of the device where preferably a divider plate is used in combination with the general structure shown in FIGS. 1 and 2. The divider plate 61 secured by means of ears 62 and rivets or bolts 63 is secured to the side walls 20 of the unit, and attached to the plate at point 64 are the circular bands or straps 65 which receive the transverse shaft 21 in such manner that the shaft can freely rotate therein. Straps 65 provide a support for the upper end of the divider plate.

This divider plate provides the important function of maintaining a uniform circular travel of the feed through the upper portions of the unit at the point or position 16 as well as causing division of the flow of feed as indicated by the arrow at 66 on FIG. 5 of the drawings. Thus, a portion of the material in making the turn at the upper forward end passes about the shaft 21 and thence in the direction of arrow 67, thus preventing clogging or packing of the feed at these portions.

The embodiment of my feed mixer and method illustrated in FIG. 7 is capable of successful use in large capacity feed mixing machines but is especially adapted for small capacity uses, for example, for cattle raisers who feed from 100 to 150 head of cattle. The machine, while generally similar to the two embodiments first described, is substantially simplified as to the means employed for distending and operatively positioning and guiding the important endless conveying, mixing and dispersing element here indicated as an entirety at X-1. This results in a material saving in cost of materials and labor for manufacture. The mixing container or box indicated as an entirety by 70, has a smooth bottom wall 70a, a substantially vertical front wall 70b interconnected with the bottom wall by an arcuately curved section 70c, a rear wall 70d and a substantially open top which preferably however has a short wall lip 70e at the forward portion thereof and a short wall lip 70f at the rear portion thereof. The elongated side walls of the box or mixing container are indicated by 70s.

Across the forward lower portion of mixing container 70 is suitably journaled a driven shaft 71 revolving in the direction of the small arrow shown in FIG. 7 and at its terminal portions sprockets 72 are affixed, lying close to the inner side of the walls 70s. Shaft 71 is driven through suitable chain belt or gear connection with a transmission mechanism (not shown) mounted upon the wheeled frame of the device and which mechanism also is drivably connected to at will and under control, drive a suitable cross conveyor or auger S mounted within a transverse trough or housing H which extends fully across the front of the box and preferably at its delivery end somewhat beyond a side of the box for controlled delivery of the mixed material.

The endless medium X-1 preferably consists in two widely spaced endless sprocket chains 73 trained at the forward and lower part of the box or mixer container, respectively, about the two sprockets 72 and then being trained about a pair of tension chain sprockets 74 which are journaled upon a transverse idler shaft 75 which extends through the two side walls of the box and is carried or journaled at the upper and sharply inclined ends of a pair of pressure bars 76 mounted close to the exterior sides of box walls 70s and urged upwardly by coil pressure springs 77 which are interposed between shaft boxes 78 for containing the extremities of shaft 75 and abutment blocks 79 which are affixed in proper spaced relation from boxes 78 to the external side walls 70s of the box. Shaft 75 is slidable longitudinally within two elongated, oblique slots 75a (see FIG. 7) which are formed respectively in the two vertical side walls 70s of the mixing box. The two endless chains 73 positioned adjacent the respective inner sides of walls 70s are then entrained about idler sprockets 80 mounted on an idler shaft 81 at the rear and lower corner portions of the box or mixer container. Shaft 81 is journaled in suitable bearings (not shown) affixed preferably to the external walls 70s.

The proportions of the idler sprockets 80 are such as to preferably cause the lower runs of chains 73 to be supported along and to move along the bottom 70a of the box.

A multiplicity of transverse slats 73a, preferably of angled V-shape, are welded or otherwise affixed to appropriate side elements or links of the chains 73 and in this form, are greater in thickness than the width of the chain to project somewhat beyond the general inner surface of the chain configuration of the endless element. The slats are spaced apart a substantial distance, which in a commercial machine, varies from 20 to 28 inches.

Positioned just rearwardly of the important driving sprockets 72 of the endless configuration element is provided transverse sprocket-protecting and deflector members 82 of generally triangular cross section, having a preferably arcuate forward wall 82a disposed concentrically and in spaced relation to the teeth of sprockets 72, and having a rear wall 82b inclined at an angle within a range of from 38° to 45° to the bottom 70a of the box. The deflector 82 extends transversely across substantially the entire width of sprocket 72, and preferably has a bottom wall 82c disposed substantially parallel and slightly above the bottom run of the chains 73.

As shown in full lines in FIG. 7, the endless medium with its positioning, driving and distending elements, is in the position it assumes before loading of the mixer container with feed ingredients to be mixed. As material is loaded, falling through the moving foraminous endless medium, mass is accumulated within the confines thereof, the effect of said accumulation particularly at the forward and medial portion of the interior of the box being sufficient to overcome the pressure exerted by the springs 77 on the thrust bars and thus the thrust bars move downwardly in their inclined relation to the box even to the extent of the dotted line positions shown in FIG. 7, and the upper and forward portions of the endless medium through the mass are bulged upwardly to an extreme position shown in dotted lines when the machine is fully loaded.

It will of course be understood that various changes may be made in the form, details and arrangement of the parts, and in the sequence of some of the steps of the method, all without departing from my general invention.

What is claimed is:

1. A method for intimately admixing a plurality of fragment feed materials which vary substantially in shape, specific gravity and size, which consists in
   moving said materials at a substantially uniform speed in several directions in a multiplicity of substantially continuous cycles through a circuitous course, within a walled mixing chamber having a bottom, which course includes horizontal travel, agitation and dispersing of such materials along a substantially horizontal run or portion of said course adjacent the bottom of said chamber in one general direction,
   then upwardly along an inclined path to an area near the top and one end of said chamber,
   then in a relatively short travel substantially horizontally and in opposite direction to said first travel run, and
   then with the assistance of gravity, widely dispersing and dropping fragments of said materials downwardly upon the top of the intermediate volume of the mass of materials being mixed.

2. The method and steps set forth in previous claim 1 further characterized by
   dividing the mass of material in its travel in that portion of said course where the material travels upwardly to said area near the top and one end of said chamber,
   said division causing a substantial flow of the material close to the upper end and top of said chamber, and a second substantial flow of material in a stream disposed substantially parallel to and within said first mentioned flow.

3. A feed mixer for intimately admixing a plurality of materials which vary substantially in shape, specific gravity and size, having in combination
   a generally rectangular, enlarged mixing container having a bottom, side and end walls,
   an endless mixing, conveying and dispersing medium mounted and distended in generally elliptic, rectangular manner within said container and having a bottom run disposed generally above the bottom of said container, and a top run disposed near the top of said container,
   one of said walls of said container having a normally closed discharge medium,
   said bottom run moving toward said discharge medium to constantly agitate and disperse the materials to be mixed, said endless mixing and conveying medium having an upper run disposed in the upper portion of said container and traveling in a direction opposite from said lower run to move the materials in the opposite direction and with the assistance of gravity, dropping and widely dispersing from said upper run downwardly upon the top of the intermediate volume of mass of materials within said endless medium, whereby the material is uniformly tumbled, fluffed and admixed,
   said medium comprising a pair of widely spaced, flexible supporting members and a plurality of transverse cross elements supported from said supporting members, and
   means for admitting materials to drop within the confines of said endless medium.

4. A feed mixer for intimately admixing a plurality of materials which vary substantially in shape, specific gravity and size, having in combination
   a generally rectangular, enlarged mixing container having a bottom, side and end walls,
   an endless mixing, conveying and dispersing medium mounted and distended in generally elliptic, rectangular manner within said container and having a bottom run disposed generally above the bottom of said container to constantly agitate and disperse the materials to be mixed, and a top run disposed at least in part near the top of said container and traveling in a direction opposite from said lower run to move the materials in the opposite direction and with the assistance of gravity, dropping and widely dispersing from said upper run downwardly upon the top of the intermediate volume of mass of material within said endless medium, whereby the material is uniformly tumbled, fluffed and admixed,
   said endless medium being of open work formation with widely spaced transverse elements extending substantially across the width of said mixing container, one of said walls adjacent an end of said container having a discharge medium, means for driving said mixing and conveyor medium in endless fashion to cause said bottom run to move toward said discharge medium and to cause said top run to move in an opposite direction, and means controllable at will for communicating said discharge medium with the interior of said container while said mixing and conveying medium is in operation.

5. A feed mixer for intimately admixing a plurality of materials which vary substantially in shape, specific gravity and size, having in combustion a generally rectangular enlarged mixing container having a bottom, side and end walls, a single endless mixing, conveying and dispersing medium mounted within said container and extended in generally elliptic rectangular manner therein and having a bottom run disposed generally above the bottom of said container and a top run at least a portion of which is normally disposed near the top of said container, said endless medium being of open work formation with widely spaced transverse elements extending in effect substantially across the width of said container, one of said walls adjacent an end of said container having a controllable discharge medium which may be opener or closed, means for driving said endless medium to cause said bottom run to move toward said discharge medium and to cause the top run to move in an opposite direction, open means adjacent the top of said container for admitting various feed materials within the confines of said endless medium, said endless medium as herein defined moving said materials in a multiplicity of substantially continuous cycles through a circuitous course which includes travel, agitation and dispersing of such materials along a run adjacent the bottom of said container in one general direction, then upwardly to an area near the top of one end of said container, and then in a travel substantially horizontally and in opposite direction to said first travel run, and then with the assistance of gravity dropping and widely dispersing from said upward run downwardly upon the top of the intermediate volume of the mass of materials within said endless medium, said endless medium being entrained at the forward end of said container about a pair of revoluble members, and means for driving said revoluble members, said endless medium being trained about two sets of widely spaced revoluble members near the rear end of said container, one set being disposed at a substantially higher level than the second set, said higher set of revoluble members being shiftable in a generally downwardly direction to slacken said endless medium when moved downwardly, resilient elements for urging said upper set of revoluble members upwardly whereby accumulation of a mass of materials within the confines of said endless member, particularly near the forward end of said endless member and upper run thereof, will bulge the upper run of said endless medium upwardly due to the pressure of such accumulating materials and cause the yielding of said resilient means to slacken said endless medium.

6. A feed mixer comprising a hollow body having side walls, lower, forward, and rear walls adapted to receive feed therein, means for mixing said feed including a pair of movable chains passing adjacently to said lower, forward and rear walls, a plurality of longitudinally spaced slats attached to said chains, means for driving said chains including a transverse shaft, sprockets attached to said shaft, said chains engaging said sprockets, said chains including a plurality of mutually pivoted links, rollers positioned at the pivoting points of said links, track members against which said rollers bear attached to the side walls of said hollow body, said tracks including upper and rear portions, and a lower portion, said body having a sloping forward wall, a discharge gate communicating through said wall, a laterally positioned horizontal conveyor for conveying mixed feed deposited on said conveyor through said gate.

7. A feed mixer comprising a hollow body having side walls, lower, forward and rear walls adapted to receive feed therein, means for mixing said feed including a pair of movable chains passing adjacently to said lower, forward and rear walls, a plurality of longitudinally spaced slats attached to said chains, means for driving said chains including a transverse shaft, sprockets attached to said shaft, said chains engaging said sprockets, said chains including a plurality of mutually pivoted links, rollers positioned at the pivoting points of said links, track members against which said rollers bear attached to the side walls of said hollow body, said tracks including upper and rear portions, a lower rear portion and a lower forward portion, said body having a sloping forward wall, a discharge gate communicating through said wall, means for adjustably opening said gate, a laterally positioned horizontal conveyor for conveying mixed feed deposited on said conveyor through said gate.

References Cited
UNITED STATES PATENTS

| | | | |
|---|---|---|---|
| 872,390 | 12/1907 | Van Glahn | 259—4 X |
| 888,918 | 5/1908 | Mallon | 198—195 |
| 1,769,576 | 7/1930 | Haines | 259—4 |
| 1,788,345 | 1/1931 | Skirvin. | |
| 1,880,284 | 10/1932 | Schenk | 259—4 |
| 2,231,114 | 2/1941 | Ferry | 198—208 |
| 2,684,752 | 7/1954 | Schultz | 198—195 |
| 2,302,656 | 11/1942 | Dray | 198—208 |
| 2,756,972 | 7/1956 | Stokes et al. | 259—37 |
| 2,991,050 | 7/1961 | Small | 259—113 X |
| 3,168,291 | 2/1965 | Knoedler et al. | 259—9 |

WALTER A. SCHEEL, *Primary Examiner.*

J. M. BELL, *Assistant Examiner.*

UNITED STATES PATENT OFFICE
CERTIFICATE OF CORRECTION

Patent No. 3,412,982                                November 26, 1968

Leon G. Feterl

It is certified that error appears in the above identified patent and that said Letters Patent are hereby corrected as shown below:

Column 9, line 13, "combustion" should read -- combination --.

Signed and sealed this 10th day of March 1970.

(SEAL)
Attest:

Edward M. Fletcher, Jr.                      WILLIAM E. SCHUYLER, JR.
Attesting Officer                              Commissioner of Patents